Jan. 16, 1940.  C. A. COX  2,187,302
ROCK PLOW
Filed April 22, 1939   2 Sheets-Sheet 1
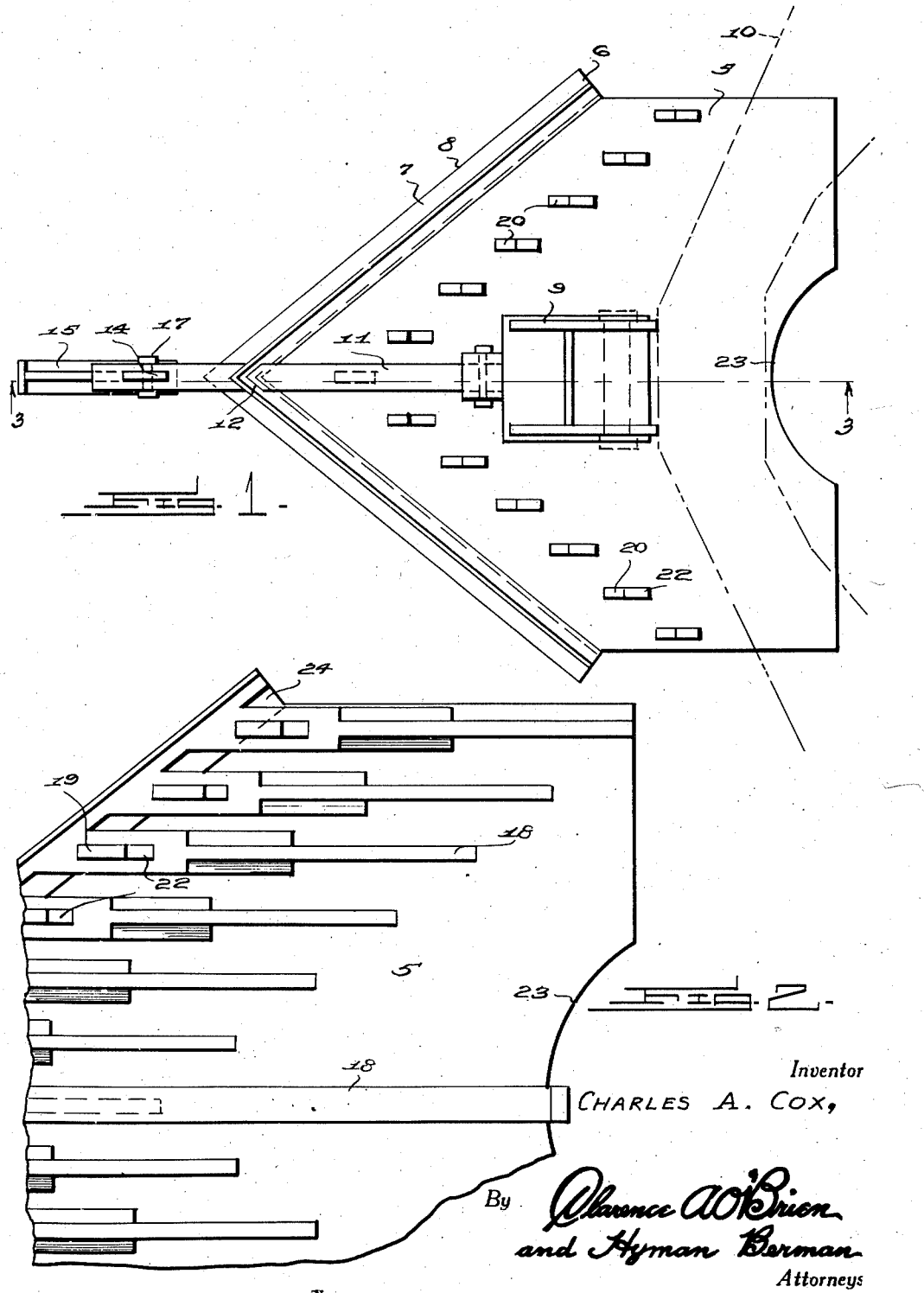
Inventor
CHARLES A. COX,
By Clarence A. O'Brien
and Hyman Berman
Attorneys

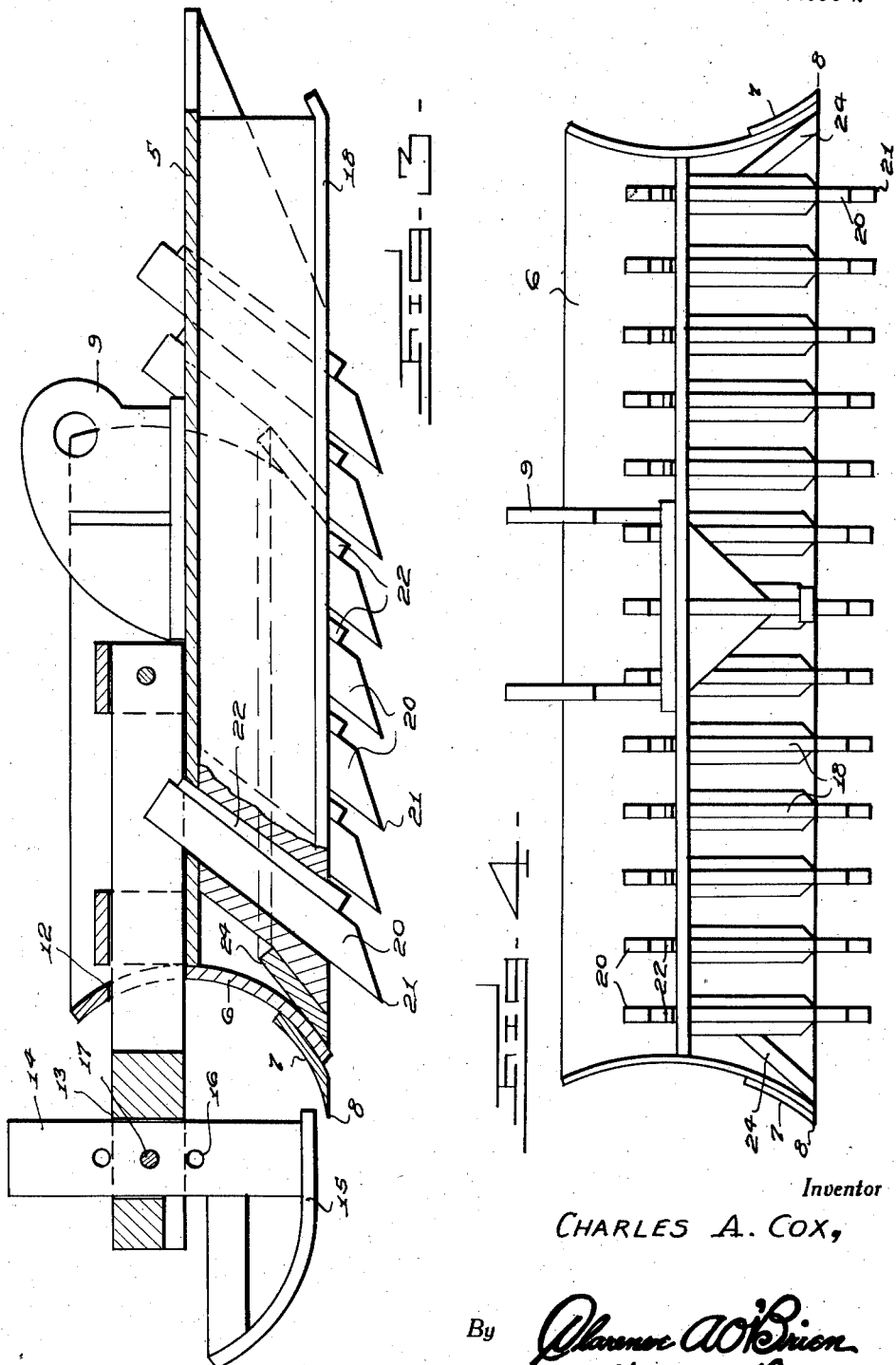

Patented Jan. 16, 1940

2,187,302

UNITED STATES PATENT OFFICE 2,187,302

ROCK PLOW

Charles A. Cox, Homestead, Fla.

Application April 22, 1939, Serial No. 269,493

2 Claims. (Cl. 97—4)

This invention relates to a rock plow especially useful for digging or removing rocks embedded in the soil, and has for the primary object the provision of a device of this character which is constructed for operation by and in advance of a tractor, preferably of the caterpillar type and which will readily loosen and raise rocks from their embedment in the ground and deposit them in the path of the tractor tread to be crushed by the weight of the tractor and also will deposit lumpy soil in the path of the tractor to be crushed thereby more efficiently pulverizing the material than similar devices now employed for the same purpose and may be readily attached to the hoist of the tractor now in use.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a top plan view illustrating a rock plow constructed in accordance with my invention.

Figure 2 is a fragmentary bottom plan view illustrating the device.

Figure 3 is a sectional view taken on the line 3—3 of Figure 1.

Figure 4 is a rear elevation illustrating the device.

Referring in detail to the drawings, the numeral 5 indicates a bed plate having the forward portion thereof of substantially triangular shape on which is mounted and conforming thereto and extending above and below thereof are mold boards 6 transversely curved and mounted on said mold boards are cutting blades 7 the cutting edges being indicated by the character 8 and are curved to conform to the contour of the mold boards. The mold boards are integrally formed with the bed plate and suitably secured on the latter and preferably centrally thereof are spaced attaching brackets 9 to which, in a well known manner, may be connected a tractor hoist indicated generally by the character 10 and shown in dotted lines in Figure 1. This conventional connection between the tractor hoist 10 and the bed plate or the spaced brackets 9 permits a pivotal movement between the bed plate and the tractor hoist.

A beam 11 is suitably secured on the bed plate and extends forwardly thereof by way of a slot 12 formed in the mold boards where the latter join each other and is provided at its forward end with an opening 13 to receive a vertically arranged post 14 of a ground shoe 15 adapted to travel in advance of the mold boards and directly in front of the apex formed by said mold boards. The post 14 is provided with a series of openings 16, any one of which is adapted to receive a pin or bolt 17 carried by the beam so that the post may be adjusted vertically with respect to the beam and thereby bring about regulation of the forward end of the device with respect to the ground, the rear end thereof being regulated by the conventional hoist on the tractor.

Formed on the under face of the bed plate is a plurality of relatively spaced ribs 18 varying in length and extending rearwardly from the mold boards in parallel relation being also integrally formed with said mold boards. The longest rib is arranged centrally of the bed plate or in alignment with the longitudinal axis of the device and is of the greatest width as clearly apparent in Figure 2.

The forward portions of the ribs 18 are increased in width and have formed therein inclined slots 19 which open through the bed plate and are for the purpose of receiving and supporting in a downwardly and forwardly inclined position teeth 20, the ground engaging ends 21 thereof being pointed. The teeth are held within the slots by wedges 22 which will permit the removal of the teeth whenever desired. The ground engaging ends 21 of the teeth are positioned a selected distance below the cutting edges 8 of the blades 7 carried by the mold boards and are for the purpose of digging into the soil to loosen and remove therefrom rocks and as this device is worked backwards and forwards over a given area by the tractor, the loosened rocks as well as lumpy soil will be gathered by the mold boards and directed laterally in the path of the traction members of the tractor so as to be crushed under the weight of the tractor and thereby bring about an efficient, quick pulverizing of the materials. The ribs 18 cooperate with the shoe 15 in governing the depth of action of the teeth in the soil.

The bed plate may have provided in its rear edge a notch 23, the purpose of which is to give clearance between a portion of the tractor and the bed plate. The portions of the mold boards extending below the bed plate may be strengthened by triangular arranged reinforcing plates or members 24 forming an integral part of the forward portions of the ribs 18.

It is believed that the foregoing description, when taken in connection with the drawings will fully set forth the construction and advantages of this invention to those skilled in the art to which such device relates, so that further detailed description will not be required.

What I claim is:

1. A rock plow comprising a horizontally arranged bed plate mounted on and in advance of a tractor, mold boards carried by said plate forwardly thereof and arranged in V-shaped formation and each including a scraper blade for action on the soil, spaced longitudinally arranged ribs formed on the under face of the bed plate and acting as runners and including slots, digging teeth located in said slots and extending a selected distance below the blades, and means for removably mounting the teeth in the slots.

2. A rock plow comprising a horizontally arranged bed plate mounted on and in advance of a tractor, mold boards carried by said plate forwardly thereof and arranged in V-shaped formation and each including a scraper blade for action on the soil, spaced longitudinally arranged ribs formed on the under face of the bed plate and acting as runners and including slots, digging teeth located in said slots and extending a selected distance below the blades, wedges driven into said slots against the teeth for removably securing the teeth in position, said ribs varying in length with the longest rib arranged to parallel the longitudinal axis of the bed plate.

CHARLES A. COX.